(12) United States Patent
Chaveron et al.

(10) Patent No.: US 11,319,050 B2
(45) Date of Patent: May 3, 2022

(54) WINDSHIELD ASSEMBLY FOR AIRCRAFT COMPRISING A PERIPHERAL FRAME SURROUNDING A SET OF PANES SEPARATED BY PILLARS THAT ARE NON-STRUCTURAL WITH RESPECT TO THE PERIPHERAL FRAME

(71) Applicant: Airbus Operations SAS, Toulouse (FR)

(72) Inventors: Loïc Chaveron, Toulouse (FR); Eric Lamat, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 43 days.

(21) Appl. No.: 16/889,975

(22) Filed: Jun. 2, 2020

(65) Prior Publication Data
US 2020/0385099 A1 Dec. 10, 2020

(30) Foreign Application Priority Data

Jun. 4, 2019 (FR) ...................................... 1905910

(51) Int. Cl.
*B64C 1/14* (2006.01)
(52) U.S. Cl.
CPC .................... *B64C 1/1492* (2013.01)
(58) Field of Classification Search
CPC .... B64C 1/1492; B64C 1/1476; B64C 1/1484
See application file for complete search history.

(56) References Cited

U.S. PATENT DOCUMENTS

| 2,403,060 | A | * | 7/1946 | Downes | ............ B32B 17/10036 52/208 |
| 2,403,061 | A | * | 7/1946 | Downes | ................ B64C 1/1492 52/208 |
| 2,406,939 | A | * | 9/1946 | Boicey | .................. B64C 1/1492 52/204.62 |
| 4,933,227 | A | * | 6/1990 | Stewart | ............ B32B 17/10018 156/102 |
| 5,277,384 | A | * | 1/1994 | Webb | .................... B64C 1/1492 244/121 |
| 7,942,369 | B2 | | 5/2011 | Mahieu et al. | |

(Continued)

FOREIGN PATENT DOCUMENTS

| EP | 2562078 A1 | 2/2013 |
| FR | 889722 A | 1/1944 |
| FR | 2905669 A1 | 3/2008 |

OTHER PUBLICATIONS

French Search Report; priority document.

*Primary Examiner* — Christopher D Hutchens
(74) *Attorney, Agent, or Firm* — Greer, Burns & Crain, Ltd.

(57) ABSTRACT

To prevent stress concentrations in the structure of an aircraft, an aircraft windshield assembly includes a peripheral frame, a windshield surrounded by the peripheral frame, the windshield comprising panes having respective lateral edges facing each other and respective other edges attached to the peripheral frame, and a pillar formed of at least one respective fishplate that covers the respective lateral edges facing each other and is bolted to the respective lateral edges facing each other, with no connection to the peripheral frame other than via the panes.

8 Claims, 6 Drawing Sheets

(56) References Cited

U.S. PATENT DOCUMENTS

| | | |
|---|---|---|
| 8,714,487 B2 | 5/2014 | Yokoi |
| 9,856,010 B2 | 1/2018 | Nakashima |
| 2013/0026296 A1* | 1/2013 | Yokoi .................. B64C 1/1476 |
| | | 244/129.3 |
| 2015/0239547 A1* | 8/2015 | Sumner .................. B64D 45/00 |
| | | 244/129.3 |

* cited by examiner

WINDSHIELD ASSEMBLY FOR AIRCRAFT COMPRISING A PERIPHERAL FRAME SURROUNDING A SET OF PANES SEPARATED BY PILLARS THAT ARE NON-STRUCTURAL WITH RESPECT TO THE PERIPHERAL FRAME

CROSS-REFERENCES TO RELATED APPLICATIONS

This application claims the benefit of the French patent application No. 1905910 filed on Jun. 4, 2019, the entire disclosures of which are incorporated herein by way of reference.

FIELD OF THE INVENTION

The present invention concerns a windshield assembly for aircraft, in particular for aircraft cockpits, of the type including a plurality of panes juxtaposed laterally, where applicable two-by-two.

BACKGROUND OF THE INVENTION

In an aircraft including a windshield with a plurality of panes juxtaposed laterally, the panes are generally framed one-by-one by corresponding windshield frames forming part of the structure of the fuselage of the aircraft. In such a case, there generally extends between two adjacent pane/frame assemblies a fuselage frame inscribed in a substantially vertical plane. Two adjacent windshield frames therefore include respective portions that form a pillar of the windshield in conjunction with the corresponding fuselage frame disposed between the respective portions.

The panes are generally fixed to the corresponding windshield frames by clamping the edges of each pane in clamping elements provided for this purpose in the corresponding windshield frame, in particular when the panes are made of mineral material such as glass.

In aircraft of this kind the panes have no structural function, that is to say, the panes do not transmit forces from one point of the surrounding structure to another.

It is moreover known to use panes made of organic material such as acrylic instead of glass panes.

In this case, the relative flexibility of the material enables fixing of the panes to the windshield frames by bolts, in which case, forces are liable to pass from one point of a frame to another via the corresponding pane.

However, the inventors have determined that, in both cases, windshield assemblies give rise to stress concentrations that degrade the fatigue resistance of the windshield, within the structure of the latter, in particular in the vicinity of the corners of the panes. This necessitates reinforcement of the structure, which leads to an increase in the weight.

SUMMARY OF THE INVENTION

A particular object of the invention is to provide a simple, economic and effective solution to this problem.

To this end the invention proposes an aircraft windshield assembly including a peripheral frame and a windshield surrounded by the peripheral frame, the windshield including:

panes having one or more pairs of respective lateral edges facing each other and respective other edges attached to the peripheral frame, and for the pair, or for each pair, of respective lateral edges facing each other, a pillar formed of at least one respective fishplate that covers the respective lateral edges facing each other and is bolted to the respective lateral edges facing each other, with no connection to the peripheral frame other than via the panes.

The fishplate, or each fishplate, thus enables the corresponding panes to be fastened to one another, without participating in the routing of forces between the sets of panes, on the one hand, and the peripheral frame, on the other hand.

The pillar, or each pillar, therefore, has no structural character with regard to the peripheral frame, unlike known type windshield pillars.

A configuration of this kind, in particular, enables at least in part prevention of the appearance of stress concentration zones as observed in prior art windshields. The inventors have, in fact, determined that a main cause of stress concentrations in known windshields resides in the fact that the pillars of those windshields tend to drain forces between the upper part and the lower part of the windshield.

The fishplate, or each fishplate, is preferably arranged on respective interior surfaces of the panes.

In preferred embodiments of the invention, the windshield further includes, for the pair, or for each pair, of respective lateral edges facing one another, a corresponding external pillar formed of at least one respective external fishplate arranged on respective exterior surfaces of the panes in such a manner as to cover each of the respective lateral edges facing one another by being fixed by bolts onto each of the respective lateral edges facing one another, with no connection to the peripheral frame other than via the panes.

In other preferred embodiments of the invention, the windshield further includes, for the pair, or for each pair, of respective lateral edges facing one another, a corresponding external pillar formed of at least one respective external cache arranged on respective exterior surfaces of the panes in such a manner as to cover each of the respective lateral edges facing one another, with no connection to the peripheral frame other than via the panes.

The panes are preferably made of organic material.

The respective other edges of the panes are preferably fixed to the peripheral frame by bolts.

The invention also concerns an aircraft including a windshield assembly of the type described hereinabove.

The windshield assembly is preferably arranged at the front of a cockpit of the aircraft.

BRIEF DESCRIPTION OF THE DRAWINGS

The invention will be better understood and other details, advantages and characteristics thereof will become apparent on reading the following description given by way of nonlimiting example and with reference to the appended drawings, in which.

In all these figures identical references may designate identical or analogous elements.

DETAILED DESCRIPTION OF THE PREFERRED EMBODIMENTS

Figure 1:
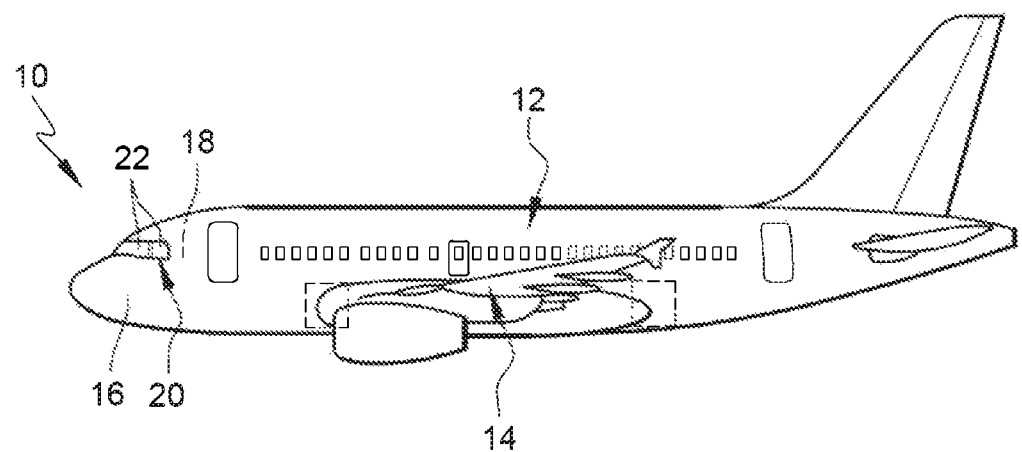
FIG. 1 is a schematic side view of an aircraft in accordance with a preferred embodiment of the invention.

FIG. 1 is a general view of an aircraft 10, more particularly an airplane, including a fuselage 12 and a wing assembly 14. The fuselage 12 includes at its forward end a nose section 16 including in particular a cockpit 18 provided with a windshield 20. The windshield 20 is disposed at the front of the cockpit and comprises a plurality of panes 22 juxtaposed laterally two-by-two.

Figure 2:
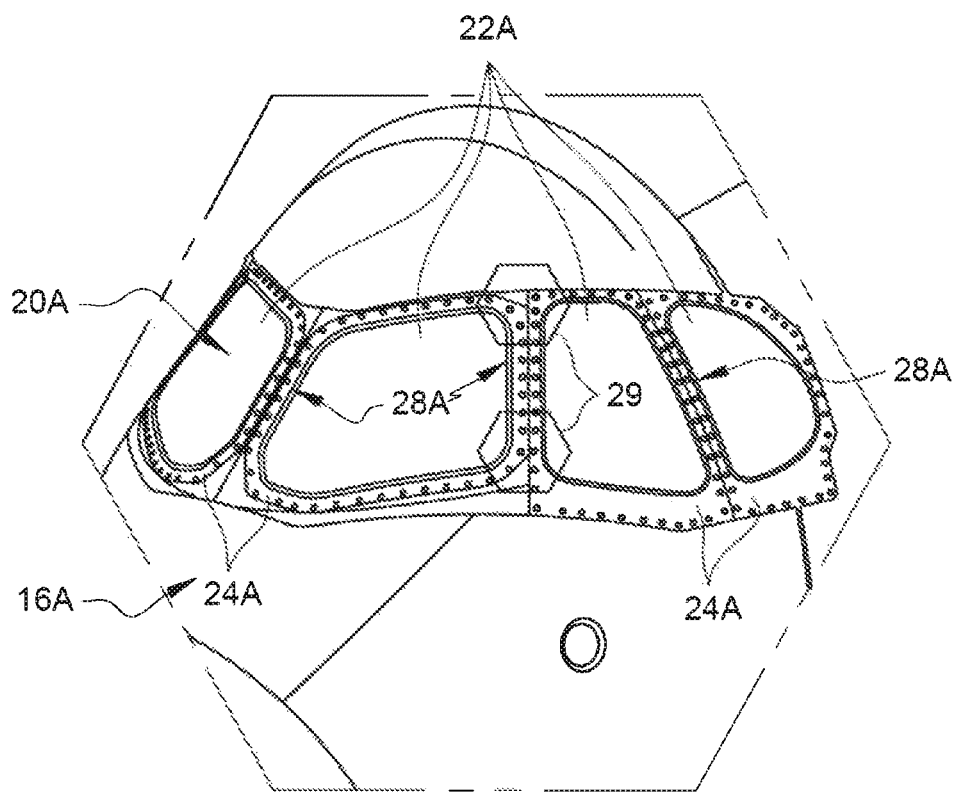
FIG. 2 is a partial schematic perspective view of an aircraft nose section of a known type, seen from the outside.
Figure 3:
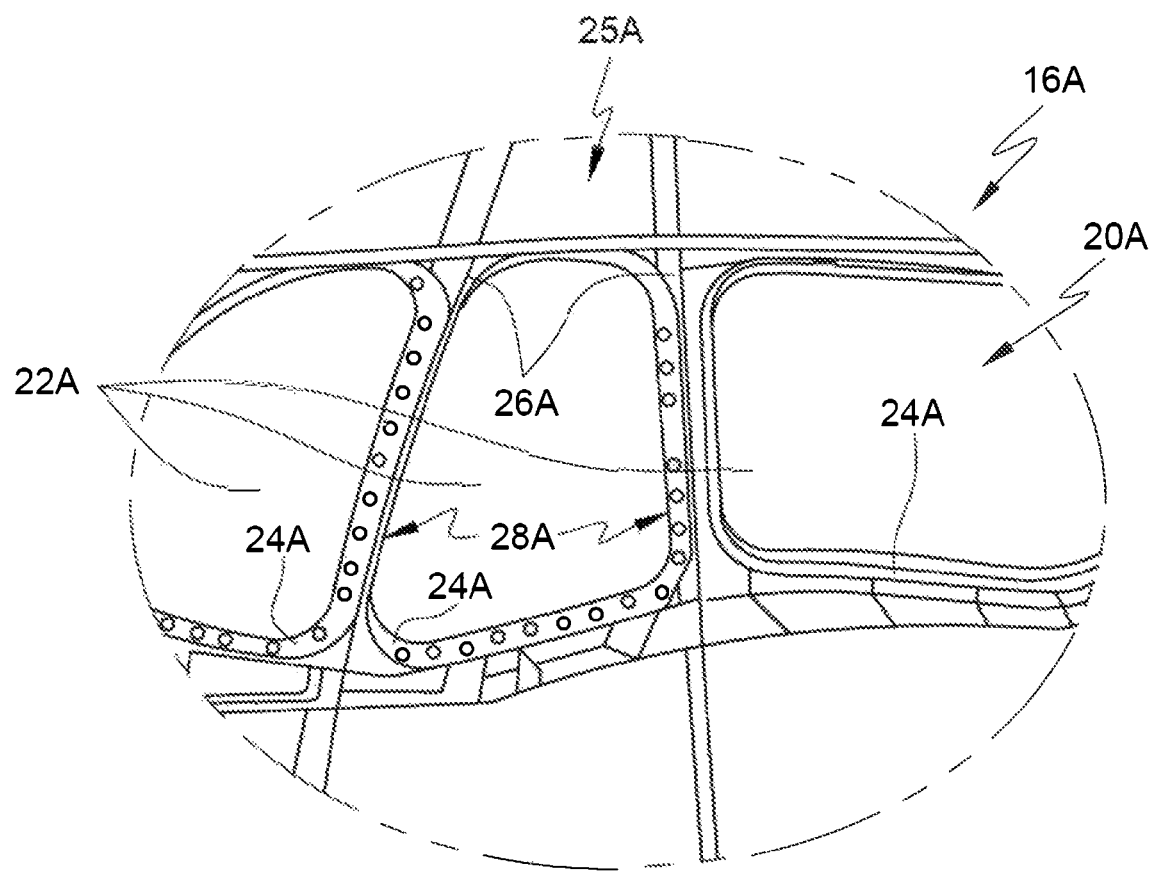
FIG. 3 is a schematic partial perspective view of the aircraft nose section from FIG. 2, seen from the inside.

FIGS. 2 and 3 show in more detail a nose section 16A in a prior art configuration and, in particular, the windshield 20A thereof.

The panes 22A are framed one-by-one by corresponding frames 24A (FIGS. 2 and 3). In other words, each pane 22A is framed by a respective frame 24A. The frames 24A are fixed to the structure 25A of the nose section 16A formed by an array of fuselage frames (FIG. 3). In particular, between each pair of adjacent frames 24A is disposed a fuselage frame 26A (FIG. 3) that lies in a respective substantially vertical plane and to which are fixed respective portions of the frames that form the pair of adjacent frames 24A. For each pair of adjacent frames 24A the respective portions of the frames 24A and the corresponding fuselage frame 26A conjointly form a pillar 28A of the windshield.

Apart from their structural function, that is to say, their contribution to the stiffness of the fuselage, the pillars 28A of the windshield are generally employed as supports for equipment in the cockpit (not visible in the figures) for the use of the flight crew of the aircraft, such as handles, compasses, etc.

In the example shown, each of the panes 22A is made of organic material, for example of acrylic, and is fixed at its edge to the corresponding frame 24A by bolts.

The panes 22A are therefore so-called structural or working panes, that is to say, able to transmit forces between different points of the surrounding structure.

The inventors of the present invention have however identified stress concentration regions 29 in the pillars 28A and in the frames 24A (FIG. 2), in particular in the vicinity of the longitudinal ends of the pillars 28A.

An object of the invention is to solve this problem at least in part, as will become clearer hereinafter.

FIGS. 4 to 10 show the nose section 16 of the aircraft 10 from FIG. 1 in a configuration implementing the principles of the present invention.

Figure 4:
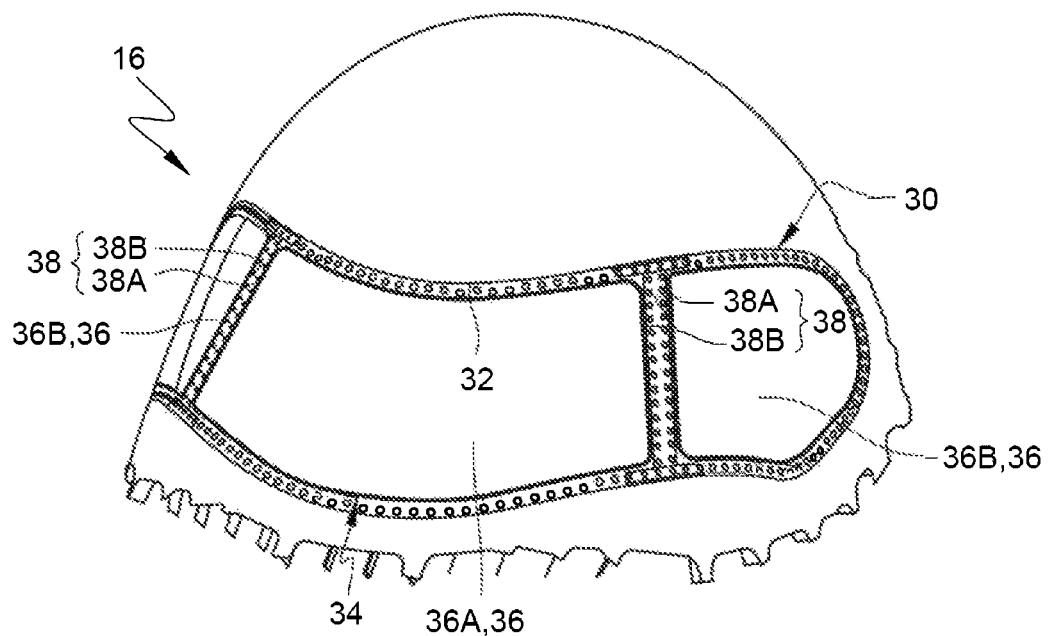
FIG. 4 is a schematic partial perspective view of a nose section of the aircraft from FIG. 1 including a windshield assembly in accordance with a preferred embodiment of the invention, seen from the outside.
Figure 6:
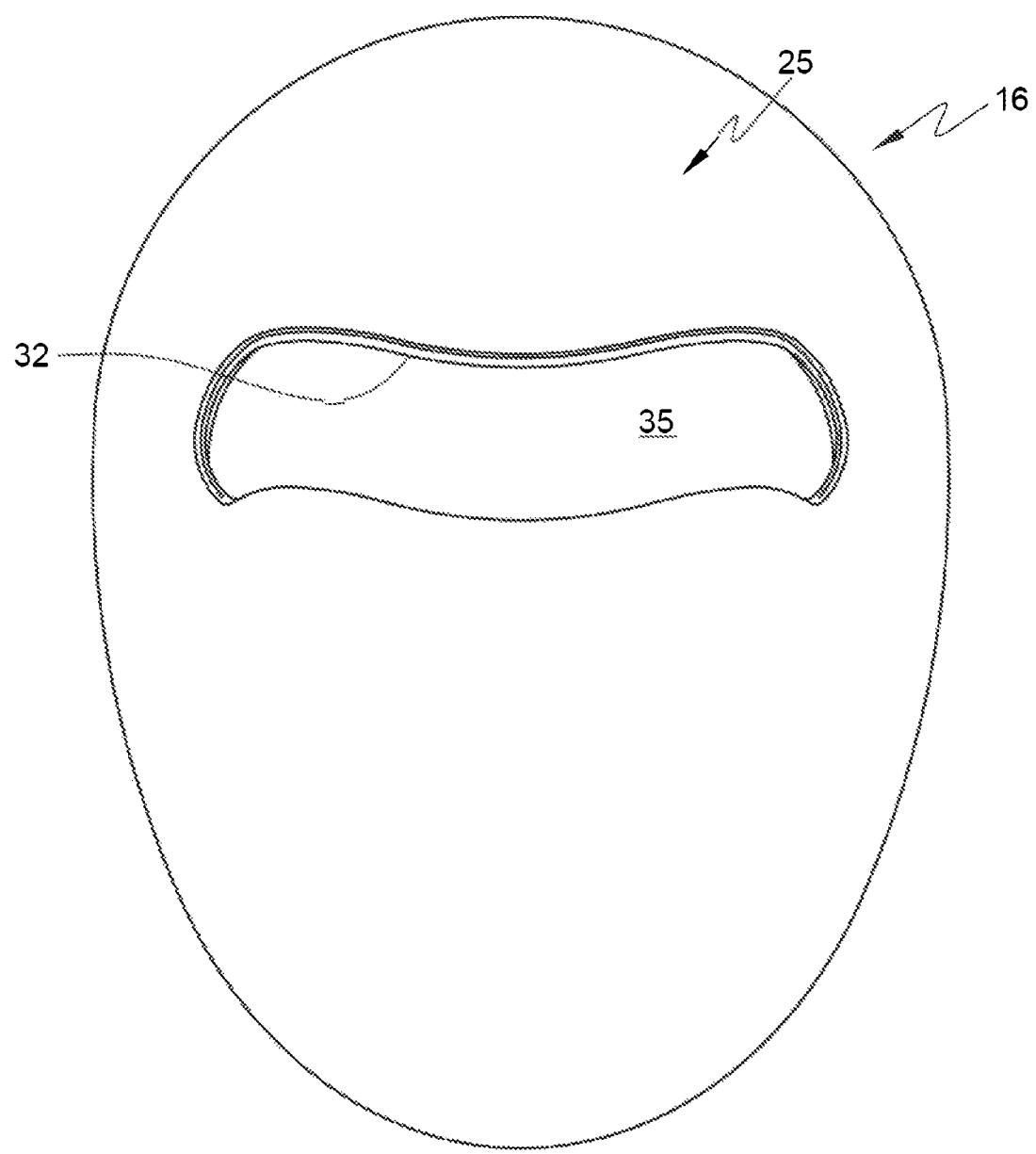
FIG. 6 is a schematic partial perspective view of the nose section from FIG. 4, seen from the inside, in which the windshield assembly cannot be seen except for a peripheral frame of that assembly.

The nose section 16 includes a windshield assembly 30 comprising a peripheral frame 32 and a windshield 34 surrounded by the peripheral frame 32 (FIG. 4). The peripheral frame 32 can be seen more clearly in FIG. 6 in which the windshield 34 is not represented. FIG. 6 therefore enables an opening 35 to be seen that is delimited by the peripheral frame 32 and intended to receive the windshield 34.

The windshield 34 includes panes 36 (FIG. 4) that are made from organic material, for example acrylic, and fixed to the peripheral frame 32 by bolts, as will emerge more clearly hereinafter. It is to be noted that, in accordance with the invention, a peripheral frame 32 frames a plurality of panes 36 whereas in the nose section from FIGS. 2 and 3 each pane 22A is framed by its respective frame 24A.

There are, for example, three panes 36 and thus a median pane 36A and two lateral panes 36B.

Figure 5:
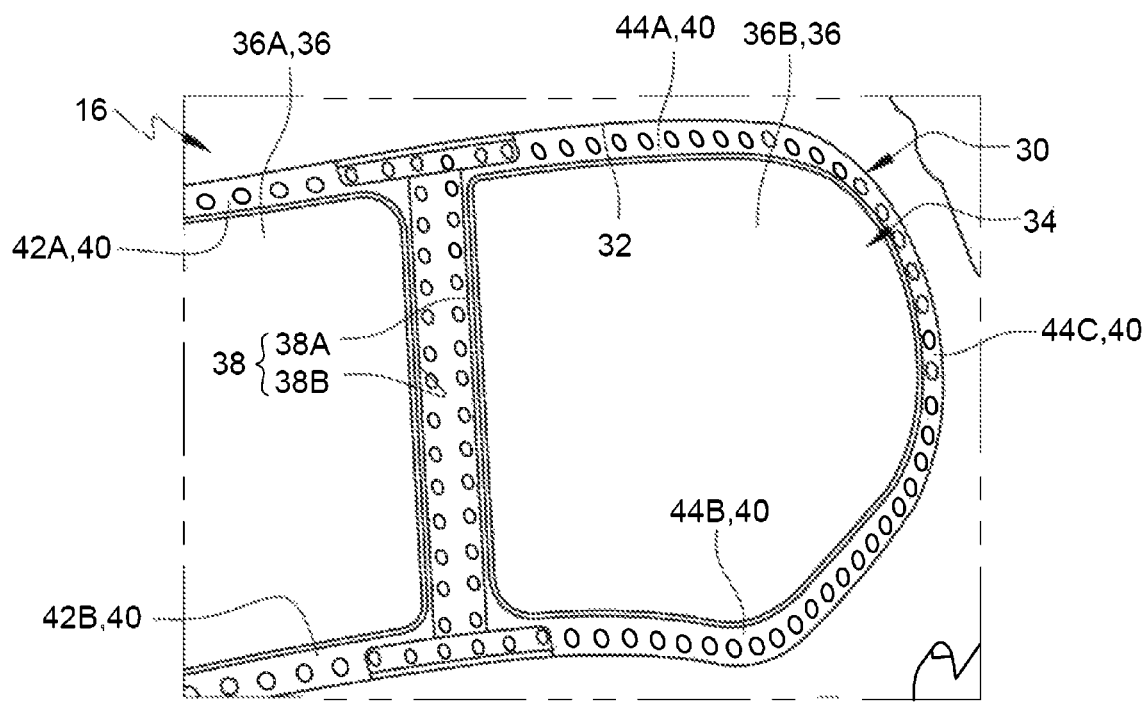
FIG. 5 is a view to a larger scale of a part of FIG. 4.

The panes 36 therefore define a plurality of pairs 38 of respective lateral edges 38A, 38B arranged facing one another, in this instance two pairs 38 of such lateral edges (FIGS. 4 and 5). By "arranged facing one another" must, in particular, be understood that no structural element of the nose section, such as a fuselage frame, is disposed between the lateral edges 38A, 38B concerned.

In other embodiments of the invention, the windshield 34 includes a plurality of median panes, in which case the number of pairs 38 of respective lateral edges 38A, 38B arranged facing one another is greater than 2.

In further embodiments of the invention, the windshield 34 includes only two panes 36 in which case the panes define only one pair 38 of respective lateral edges 38A, 38B arranged facing one another.

In all cases, the panes 36 also have respective edges 40, referred to as peripheral edges hereinafter, by which the panes 36 are fixed to the peripheral frame 32 by bolts. In the case of the median pane 36A, this refers to an upper edge 42A and a lower edge 42B of that pane. In the case of each lateral pane 36B, this refers to an upper edge 44A, a lower edge 44B and a lateral end edge 44C which together, for example, define a curved edge geometry.

Figure 7:
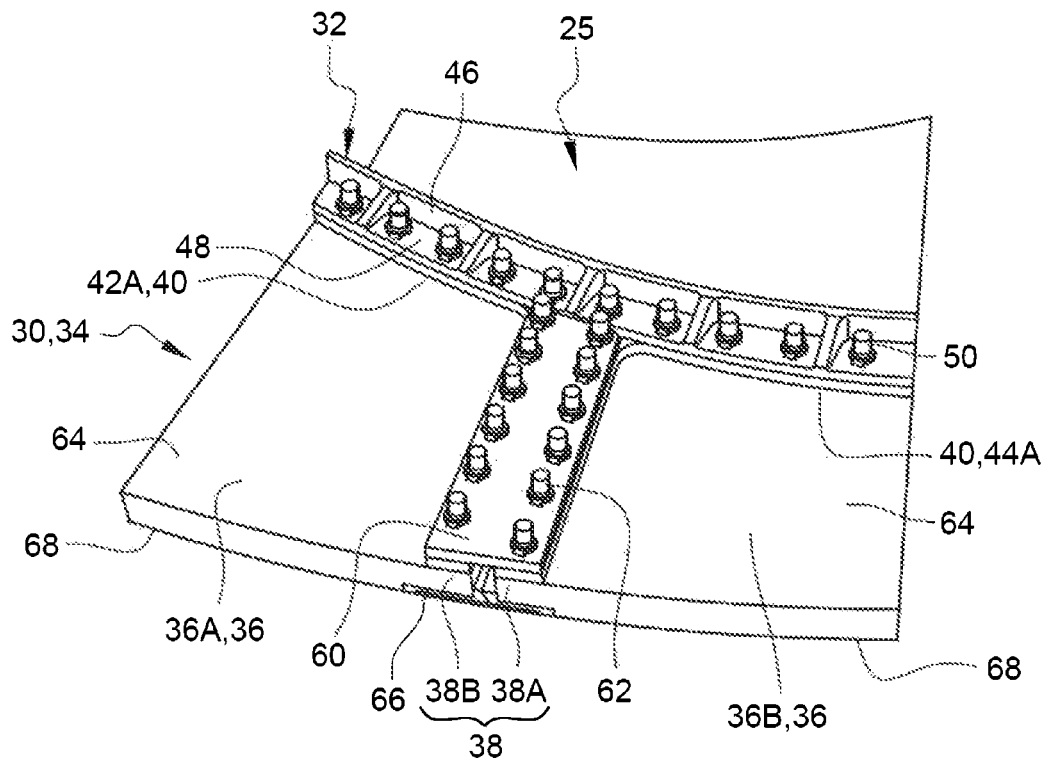
FIG. 7 is a schematic partial perspective view in section of the windshield assembly of the nose section from FIG. 4 showing an interior side of the windshield assembly.
Figure 9:
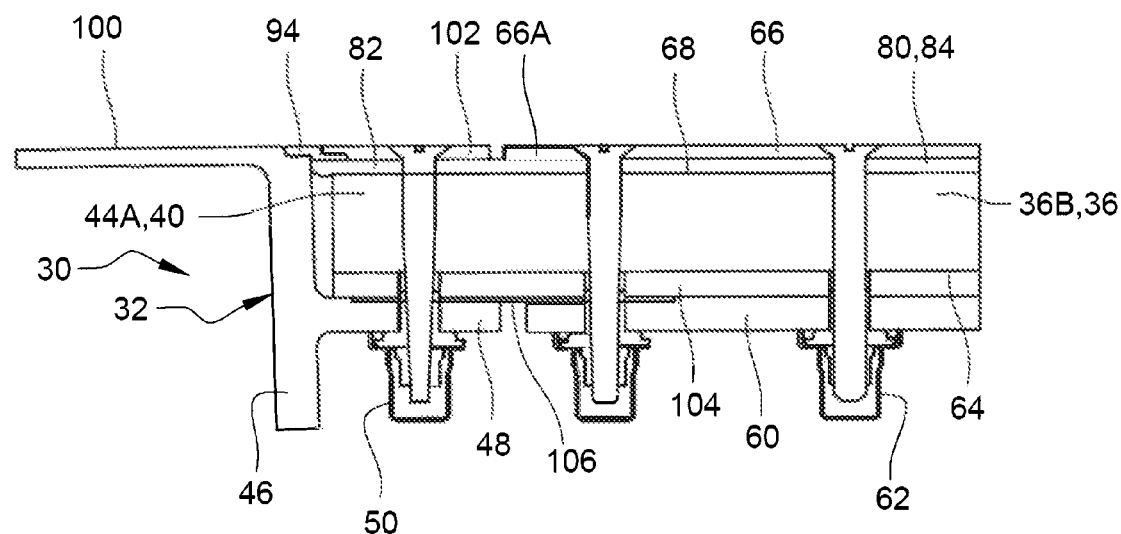
FIG. 9 is a schematic partial view in section taken along the line IX-IX of FIG. 8 of the windshield assembly of the nose section from FIG. 4.

To be more precise, referring to FIGS. 7 and 9, the peripheral frame 32 includes, in particular, a core 46 and a flange 48 extending substantially orthogonally to the core 46 from the latter and in the direction of the opening 35 delimited by the frame. The core 46 is fixed to the structure 25 of the nose section 16, for example on a self-stiffened panel that is part of the structure. The aforementioned peripheral edges 40 of the panes 36 are placed on the flange 48 and fixed to the latter by means of fixing bolts 50.

Figure 10:
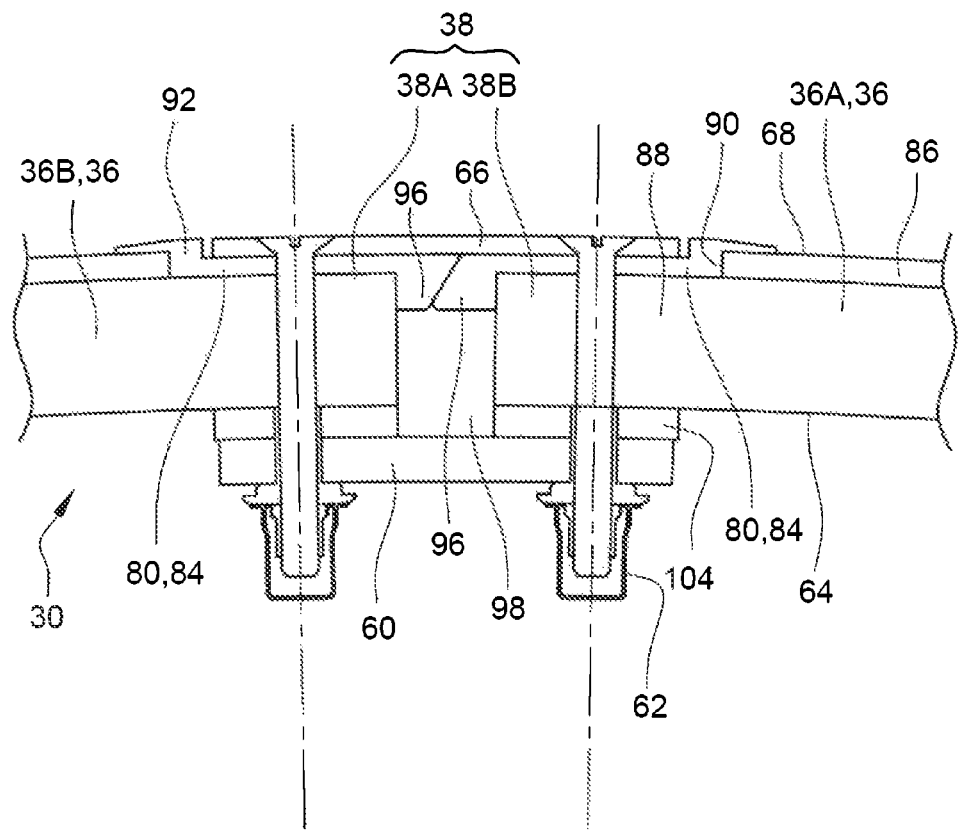
FIG. 10 is a schematic partial view in section taken along the line X-X of FIG. 8 of the windshield assembly of the nose section from FIG. 4.

Moreover, referring to FIGS. 7, 9 and 10, the windshield 34 further includes, for each pair 38 of respective lateral edges 38A, 38B facing one another, a corresponding pillar formed of a respective fishplate 60 that covers each of the respective lateral edges 38A, 38B concerned and is fixed by means of fishplate bolts 62 to each of the respective lateral edges 38A, 38B concerned, with no connection of fishplate 60 to the peripheral frame 32 other than via the panes 36.

It must be understood from this that each fishplate 60 is a part separate from the peripheral frame 32 and is not connected to the peripheral frame 32 other than via the corresponding panes 36. In other words, any force that may pass from a fishplate 60 of this kind to the peripheral frame 32 necessarily passes through at least one pane 36. It is to be remembered that, by definition, a fishplate is a part configured to transmit forces between two other parts to which the fishplate is fixed. The fishplates 60 are therefore bolted to the panes 36 in such a manner as to enable such transmission of forces between the panes.

The fishplates 60 forming the pillars therefore enable the panes 36 to be fastened to one another without participating in the routing of forces between the set of panes 36 and the peripheral frame 32. The pillars, therefore, have no structural character with regard to the peripheral frame 32, unlike known windshield pillars. The invention, therefore, proposes a way to benefit from the mechanical properties of the panes for the distributed transmission of forces between the front nose section situated above the windshield and the structure of the nose section situated below the windshield. A configuration of this kind, in particular, enables at least in part prevention of the appearance of stress concentration zones as observed in the nose section of known type shown in FIGS. 2 and 3.

In the embodiment shown, the fishplates 60 forming the pillars are arranged on the respective interior surfaces 64 of the panes 36, that is to say, the surfaces of the panes disposed on the side of the interior of the cockpit. The fishplates 60 can therefore be relatively thick, and therefore rigid, without any negative impact on the aerodynamic performance of the aircraft. Each fishplate 60 advantageously has a thickness substantially equal to the thickness of the flange 48 of the peripheral frame 32 and is level with the flange (FIGS. 7 and 9).

Figure 8:
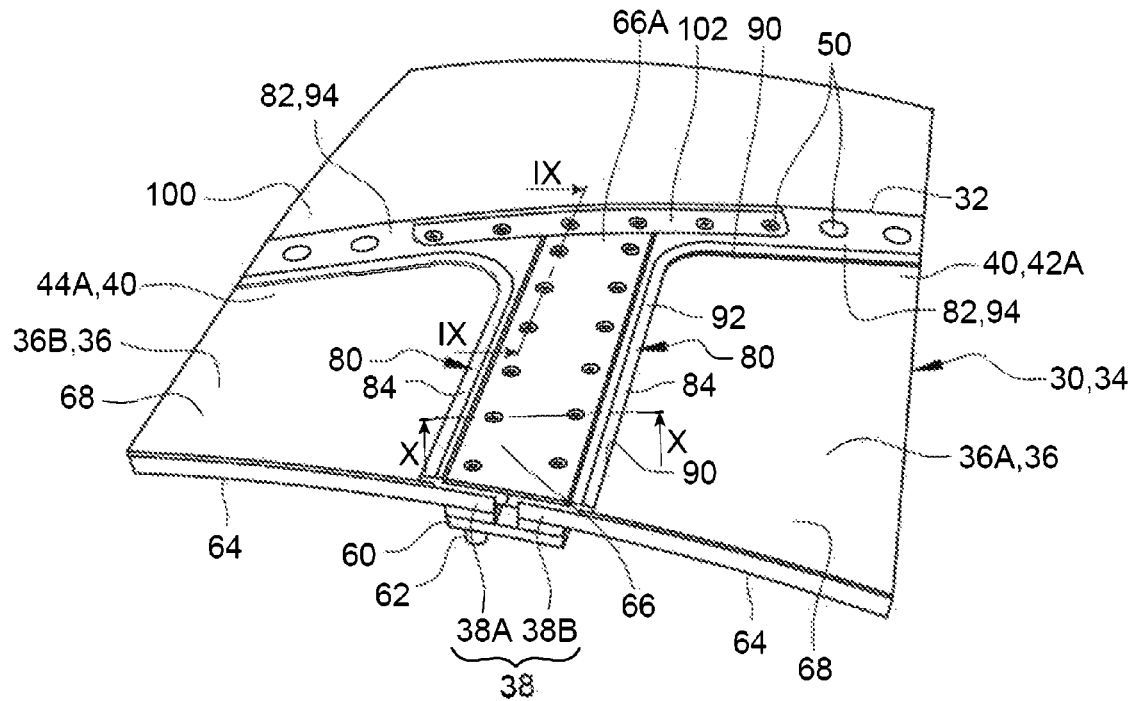
FIG. 8 is a schematic partial perspective view in section of the windshield assembly of the nose section from FIG. 4 showing an exterior side of the windshield assembly.

Moreover, referring to FIGS. 8, 9 and 10, the windshield 34 further includes, for each pair 38 of respective lateral edges 38A, 38B facing one another, a corresponding external pillar formed of at least one respective external fishplate 66 arranged on respective exterior surfaces 68 of the panes, that is to say, on the surfaces of the panes disposed on the side of the exterior of the cockpit. To be more precise, each external fishplate 66 covers the corresponding respective lateral edges 38A, 38B and is fixed to each of the corresponding respective lateral edges 38A, 38B by bolts, with no connection to the peripheral frame 32 other than via the panes 36. As FIGS. 9 and 10 show, the external fishplates 66 are, for example, fixed to the panes 36 by the aforementioned fishplate bolts 62, conjointly with the fishplates 60.

In an analogous manner to that described hereinabove where the fishplates 60 are concerned, the external fishplates 66 forming the external pillars therefore enable contribution to the fastening of the panes 36 to one another without having any structural function with regard to the peripheral frame 32. In particular, the combination of the pillars formed by the fishplates 60, on the one hand, and the external pillars formed by the external fishplates 66, on the other hand, enables good distribution of forces liable to transit between adjacent panes 36.

The external fishplates 66 being arranged on the respective exterior surfaces 68 of the panes 36, it is preferable for the thickness of the external fishplates 66 to be limited, and, in particular, to be less than the thickness of the fishplates 60, as can be seen in FIGS. 9 and 10.

Other advantageous details of the embodiment described can be seen in FIGS. 7 to 10.

In particular, each pane 36 is surrounded by a seal 80 disposed on its exterior surface 68 (FIGS. 8 to 10). A seal 80 of this kind includes portions, referred to as peripheral portions 82, fixed to the peripheral edges 40 of the pane 36 by glue and having the corresponding fixing bolts 50 pass through them, together with one or more portions, referred to as lateral portions 84, fixed to the corresponding lateral edge or edges 38A, 38B by gluing, and having the corresponding fishplate bolts 62 pass through them. The lateral portions 84 are, in particular, disposed between the corresponding external fishplates 66 and the corresponding panes 36.

Each pane 36 has, for example, a preeminent central part 86 surrounded by a peripheral part 88 separated from the central part 86 by a step 90 that descends in the direction from the central part 86 to the peripheral part 88 (FIG. 10), so that each peripheral portion 82 and each lateral portion 84 of the corresponding seal 80 is pressed onto the peripheral part 88 and against the step 90.

Each seal 80, therefore, advantageously includes an internal rim 92 straddling a perimeter of the central part 86 of the corresponding pane 36 (FIGS. 8 and 10). Moreover, the peripheral portions 82 of a seal 80 of this kind preferably have respective external rims 94 straddling the peripheral frame 32 (FIGS. 8 and 9). Moreover, each lateral portion 84 of a seal 80 of this kind preferably has a respective lateral rim 96 engaged in a gap 98 formed between the corresponding two lateral edges 38A, 38B, whereby the respective lateral edges 96 of the respective seals 80 of the two adjacent panes 36 come into contact with one another and thus form a sealed barrier between the two panes 36.

Moreover, each external fishplate 66 is arranged on two respective lateral portions 84 of the respective seals 80 of the corresponding panes 36, between the respective internal rims 92 of these seals 80. In particular, each external fishplate 66 is advantageously level with the corresponding internal rims 92.

Thus, each seal 80 is generally conformed to limit optimally the presence of protrusions on the exterior surface of the windshield assembly, given that such protrusions would degrade the aerodynamic performance of the aircraft.

Moreover, with reference to FIGS. 8 and 9, and still to avoid the presence of protrusions on the exterior surface of the nose section, in particular between the longitudinal ends 66A of the external fishplates 66 and an exterior surface 100 of the peripheral frame 32, a respective end cache 102 is arranged to straddle the exterior surfaces 68 of two adjacent panes, facing (that is to say, substantially in continuity with) each longitudinal end 66A of the corresponding external fishplate 66. An end cache 102 of this kind preferably extends laterally beyond corresponding external fishplate 66, on either side of the latter (FIG. 8).

Moreover, in the example shown, composite material shims 104 are disposed between the interior surface 64 of each pane 36 and the corresponding fishplate 60, or each corresponding fishplate 60, in order to protect each interior surface 64 from the pressure exerted on the latter by the corresponding fishplate 60, or each corresponding fishplate 60, because of the effect of the clamping force produced by the corresponding fishplate bolts 62 (FIG. 10). The shims 104 are, moreover, extended so as also to be disposed between the flange 48 of the peripheral frame 32 and the corresponding peripheral edges 40 (FIG. 9). The shims 104 are, for example, glued to the respective interior surfaces of the panes 36.

Moreover, a metal, for example aluminum, tape 106 is disposed between each shim 104, on the one hand, and the flange 48 of the peripheral frame 32 and the longitudinal end 66A of the corresponding external fishplate 66, on the other hand (FIG. 9).

In other embodiments of the invention, the aforementioned external uprights are formed by external caches, that is to say, elements similar to the external fishplates 66 but fixed to the panes 36 in such a manner that the external caches do not contribute significantly to the transmission of forces between adjacent panes.

Moreover, in other embodiments of the invention, each upright is formed of a plurality of fishplates arranged one behind the other in the longitudinal direction of the upright, each fishplate covering and being fixed to each of the respective lateral edges 38A, 38B concerned, with no connection to the peripheral frame 32 other than via the panes 36, as explained hereinabove.

In an analogous manner, each external pillar may instead be formed of a plurality of external fishplates arranged one behind the other in the longitudinal direction of the external pillar or formed of a plurality of external caches arranged one behind the other in the longitudinal direction of the external upright, each external fishplate or each external cache covering and being fixed to each of the respective lateral edges 38A, 38B concerned, with no connection to the peripheral frame 32 other than via the panes 36, as explained hereinabove.

Apart from the advantage referred to above of reducing stress concentrations in the structure, the invention has the following additional advantage.

Because of the non-structural character of the pillars, and where applicable, the external pillars, given the peripheral frame 32 and therefore given the structure 25 of the nose section, aircraft designers are free to position the pillars, and any external pillars, at the locations of their choice without having to take account of the configuration of the surrounding structure. The layout of the pillars can therefore be adapted optimally as a function of the optimum locations of cockpit equipment intended to be supported by the pillars or to enable improvement of the field of view of the pilot. This can also enable the use of panes having larger dimensions than prior art panes.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft windshield assembly including a peripheral frame and a windshield surrounded by the peripheral frame, the windshield including:
   panes having one or more pairs of respective lateral edges facing each other and respective other edges attached to the peripheral frame, and
   for the pair, or for each pair, of respective lateral edges facing each other, a pillar formed of at least one respective fishplate that covers the respective lateral edges facing each other and is bolted to the panes outwardly of the respective lateral edges facing each other, with no connection to the peripheral frame other than via the panes.

2. The windshield assembly as claimed in claim 1, in which the fishplate, or each fishplate, is arranged on respective interior surfaces of the panes.

3. The windshield assembly as claimed in claim 2, in which the windshield further includes, for the pair, or for each pair, of respective lateral edges facing one another, a corresponding external pillar formed of at least one respective external fishplate arranged on respective exterior surfaces of the panes in such a manner as to cover each of the respective lateral edges facing one another by being fixed by bolts onto each of the respective lateral edges facing one another, with no connection to the peripheral frame other than via the panes.

4. The windshield assembly as claimed in claim 2, in which the windshield further includes, for the pair, or for each pair, of respective lateral edges facing one another, a corresponding external pillar formed of at least one respective external cache arranged on respective exterior surfaces of the panes in such a manner as to cover each of the respective lateral edges facing one another, with no connection to the peripheral frame other than via the panes.

5. The windshield assembly as claimed in claim 1, in which the panes are made of organic material.

6. The windshield assembly as claimed in claim 1, in which the respective other edges of the panes are fixed by bolts to the peripheral frame.

7. An aircraft including a windshield assembly as claimed in claim 1.

8. The aircraft as claimed in claim 7 in which the windshield assembly is arranged at the front of a cockpit of the aircraft.

* * * * *